United States Patent
Bova

(10) Patent No.: US 7,962,931 B2
(45) Date of Patent: Jun. 14, 2011

(54) METHOD AND SYSTEM FOR INTEGRATING TELEVISION BRAND ADVERTISING WITH PROMOTIONAL MARKETING

(75) Inventor: Alfred T. Bova, Avon, CT (US)

(73) Assignee: Coupons.com Incorporated, Mountain View, CA (US)

( * ) Notice: Subject to any disclaimer, the term of this patent is extended or adjusted under 35 U.S.C. 154(b) by 1453 days.

(21) Appl. No.: 10/328,300

(22) Filed: Dec. 23, 2002

(65) Prior Publication Data

US 2004/0123314 A1    Jun. 24, 2004

(51) Int. Cl.
*H04N 7/10* (2006.01)
*H04N 7/16* (2006.01)
*G06Q 30/00* (2006.01)

(52) U.S. Cl. ........ 725/32; 725/23; 705/14.1; 705/14.13; 705/14.14; 705/14.23; 705/14.49

(58) Field of Classification Search .................... 725/23; 705/14.1, 14.13, 14.14, 14.23, 14.49
See application file for complete search history.

(56) References Cited

U.S. PATENT DOCUMENTS

| | | | |
|---|---|---|---|
| 3,848,082 A | 11/1974 | Summers | 178/5.6 |
| 4,674,041 A | 6/1987 | Lemon et al. | 364/401 |
| 4,876,592 A | 10/1989 | Von Kohorn | 358/84 |
| 5,128,752 A | 7/1992 | Von Kohorn | 358/84 |
| 5,185,695 A | 2/1993 | Pruchnicki | 364/401 |
| RE34,915 E | 4/1995 | Nichtberger et al. | 364/401 |
| 5,604,542 A | 2/1997 | Dedrick | 348/552 |
| 5,612,741 A | 3/1997 | Loban et al. | |
| 5,761,648 A | 6/1998 | Golden et al. | 705/14 |
| 5,848,396 A * | 12/1998 | Gerace | 705/10 |
| 5,978,013 A * | 11/1999 | Jones et al. | 725/23 |
| 6,032,130 A | 2/2000 | Alloul et al. | |
| 6,256,739 B1 | 7/2001 | Skopp et al. | |
| 6,326,982 B1 | 12/2001 | Wu et al. | |
| 6,424,998 B2 | 7/2002 | Hunter | |
| 6,430,605 B2 | 8/2002 | Hunter | |
| 6,484,148 B1 | 11/2002 | Boyd | |
| 6,584,492 B1 | 6/2003 | Cezar et al. | |
| 7,206,754 B1 * | 4/2007 | Spector | 705/14 |
| 7,302,696 B1 * | 11/2007 | Yamamoto | 725/23 |
| 2002/0107739 A1 * | 8/2002 | Schlee | 705/14 |
| 2002/0130511 A1 * | 9/2002 | Thompson et al. | 283/81 |
| 2003/0079221 A1 * | 4/2003 | Bruner | 725/23 |
| 2003/0088463 A1 | 5/2003 | Kanevsky et al. | |
| 2003/0126597 A1 * | 7/2003 | Darby et al. | 725/32 |
| 2004/0078269 A1 | 4/2004 | Sprogis | |
| 2007/0162341 A1 * | 7/2007 | McConnell et al. | 705/14 |

* cited by examiner

Primary Examiner — Dominic D Saltarelli
Assistant Examiner — Gigi L Dubasky
(74) Attorney, Agent, or Firm — Hickman Palermo Truong & Becker LLP

(57) ABSTRACT

A method for integrating television brand advertising with promotional marketing includes providing an image to be displayed in different television commercials for products from different advertisers, the image indicating a website; and providing at the website coupon offers for the products from the different advertisers. The image will alert a viewer of the television commercial that a special coupon offer is available at a website. The viewer will go to the website and be able to select from one or more coupon offers available to consumers in their market area. The consumer then prints the coupons, or adds credit to a coupon card, which is then redeemed at the retailer. The system allows for Point Of Sale (POS) redemption, or more traditional redemption through a coupon clearinghouse. The television commercials may be encoded with information to be used at a television signal processing location for selecting the images, and different images may be provided to television signal processing locations associated with different market areas.

30 Claims, 10 Drawing Sheets

METHOD AND SYSTEM FOR INTEGRATING TELEVISION BRAND ADVERTISING WITH PROMOTIONAL MARKETING

BACKGROUND

This invention relates to the field promotional marketing. More specifically, this invention relates to a method and system for integrating television brand advertising with promotional marketing.

The promotional marketing and coupon industry is fraught with waste and inefficiency. In the year 2001, 344 billion coupons were distributed, while only 3.9 billion or 1.1% were redeemed (Coupon Council of America). Total savings to consumers were $3 billion. Freestanding inserts (FSI's), one of the more popular ways to nationally distribute coupons, had a redemption rate of less than one percent in 2001. One interesting note is that coupons distributed over the Internet had a redemption rate of 2.91%, almost three times the rate of FSI coupons redeemed.

Another popular form of marketing is brand advertising, which is typically done by the use of television commercials. According to the Television Bureau of advertising, in 2001, the amount spent both in network and spot television advertising was $35.8 billion.

The Internet as an advertising medium is hampered by its low reach, but has the benefits of being able to be more precisely targeted to an audience. FSI's and television have a large reach, but are harder to target to a specific audience. FSI creation also has the disadvantage of a longer planning time, as graphic ads need to be created, and then printed and inserted into newspapers on a national basis. This lead-time adds months onto a marketing plan. Tailoring specific offers for specific geographic markets also adds expense to a campaign with the creation of multiple different ads or commercials for each market.

SUMMARY OF THE INVENTION

The above-described drawbacks and deficiencies of the prior art are overcome or alleviated by a method for integrating television brand advertising with promotional marketing, the method including: providing a first image to be displayed in different television commercials for products from different advertisers, the first image indicating a website; and providing at the website coupon offers for the products from the different advertisers. The method may further include: providing second images to be displayed in the different television commercials, the second images indicating price point offers associated with the coupon offers for the products.

In one embodiment, the first and second images are inserted in the television commercial at a television signal processing location. The television commercial may be encoded with information to be used at the television signal processing location for selecting at least one of the first image and the second image. Different second images may be provided to television signal processing locations associated with different market areas.

In another embodiment, the method further includes, selecting from the coupon offers a plurality of coupon offers available to a consumer, wherein the selecting is performed using at least one of a location of the consumer, past behavior of the consumer on the website, and coupons previously redeemed by the consumer. In another embodiment, the method further includes providing at the website a printable coupon or providing credit to a coupon card for redeeming at least one of the coupon offers. In yet another embodiment, the method includes reporting to at least one of the different advertisers information including at least one of: a number of coupons printed by consumers, and a number of coupons redeemed by the consumers.

BRIEF DESCRIPTION OF THE DRAWINGS

Referring to the exemplary drawings wherein like elements are numbered alike in the several Figures.

DETAILED DESCRIPTION

Figure 1:
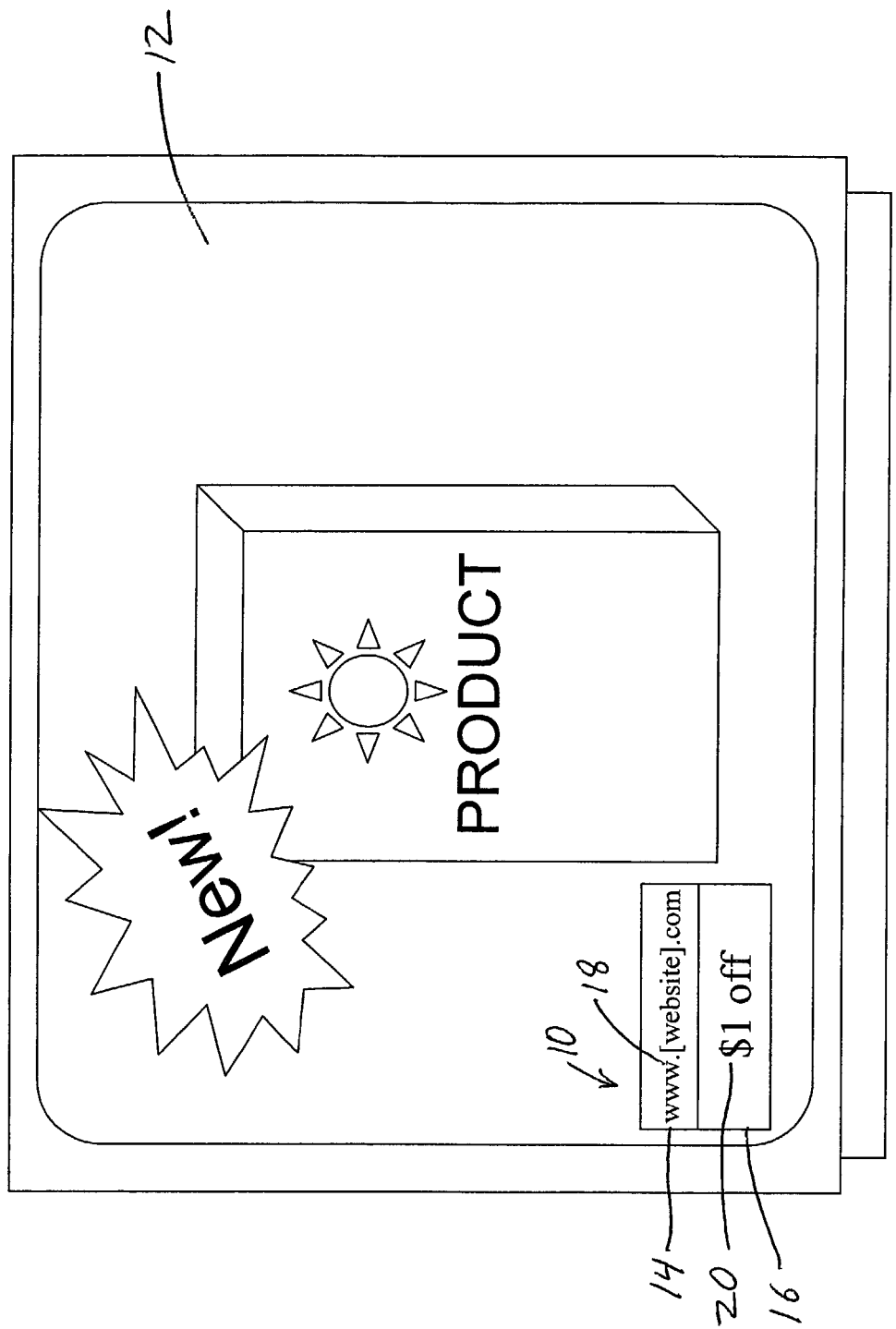
FIG. 1 is a schematic view of a television screen displaying a commercial for a product and an indicator indicating a coupon offer available for the product.

Referring to FIG. 1, the present invention provides an image of a special offer indicator (indicator) 10 to be displayed on a television monitor 12 on top of a television commercial for a product, service, or the like (hereinafter "product"). The indicator 10 will alert a viewer of the television monitor 12 that a special coupon offer is available from the product at a website, the Uniform Resource Locator (URL) of which is shown on the indicator 10. As used herein, a "website" is a site (location) on the World Wide Web. The consumer will go to the website, provide data indicating their geographic location, and be able to select from one or more coupon offers available to consumers in their market area. The indicator 10 may be displayed on top television commercials for any number of different products from any number of different advertisers, and the website will provide coupon offers available for the different products. The consumer then prints the coupons, or adds credit to a unique coupon card, which is then redeemed at the retailer. The coupon card may be provided by the website operator, or may be a customer loyalty card available from a retailer. The system allows for Point Of Sale (POS) redemption, or more traditional redemption through a coupon clearinghouse. Another embodiment allows the coupon card to contain all offers for that consumer's market area without the need for encoding the offers on the card.

Figure 2:
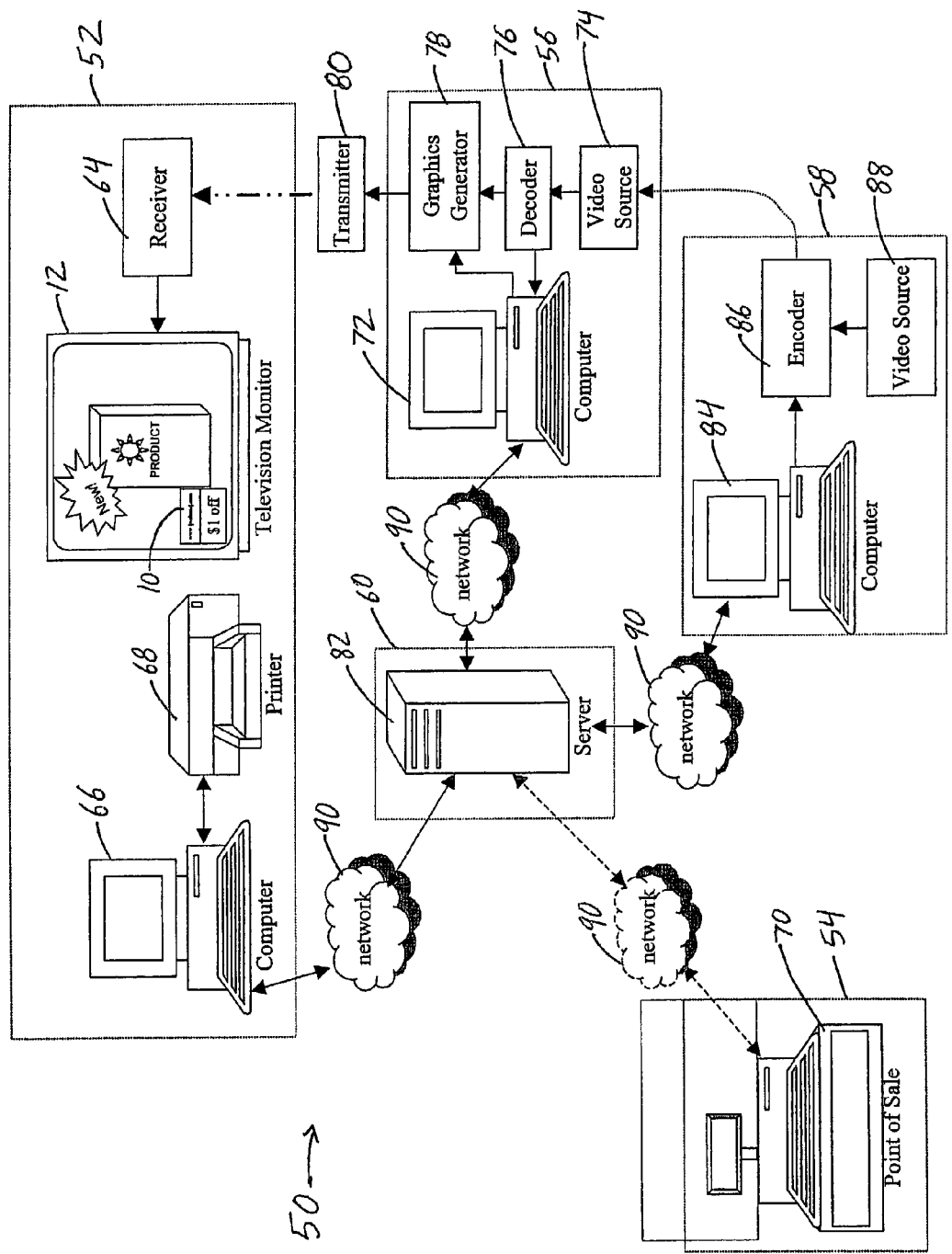
FIG. 2 is a schematic diagram of a system for integrating television brand advertising with promotional marketing.

Referring to FIG. 2, a system 50 for integrating television brand advertising with promotional marketing is shown. System 50 includes five general locations: a consumer location (e.g., a household) 52, a point of sale location (e.g., a retail store) 54, a television signal processing location (e.g., a national network source, a regional television station source, or a local broadcast source such as for a cable television system) 56, an advertiser location 58, and a website server location 60. Positioned at the consumer location 52 are the television monitor 12, a television signal receiver 64, a computer 66, and a printer 68. Positioned at the point of sale location 54 is a register 70, such as a cash register, computer, or the like for registering a sale of a product or service. Positioned at the television signal processing location 56 are a computer 72, video source 74, decoder 76, and a graphics generator 78. A transmitter 80 may also be located at the television signal processing location for transmitting the television signals to the consumer locations 52. Positioned at the website server location 60 is at least one server computer 82. Positioned at the advertiser location 58 are a computer 84, an encoder 86, and a video source 88. It will be appreciated that these locations are provided to facilitate description of the system 50, and the various components of the system 50 may be positioned at locations different than those shown as is convenient for performing the method described herein.

Server computer 82 is coupled to computers 66, 72, and 84 by one or more communications networks 90. Similarly, server computer 82 may be coupled to one or more point of sale registers 70 by a communications network 90. Communications networks 90 may be a common communications network or different communications networks, and may include one or more of a local area network, a wide area network, an Internet, a telephone network, and the like. To facilitate the description of system 50, computer 82 and computers 66, 72, and 84 are discussed herein as being single computers. However, it will be appreciated that the functions performed by server computer 82 and the functions performed by computers 66, 72, and 84 may be distributed to any number of computers.

Figure 3:
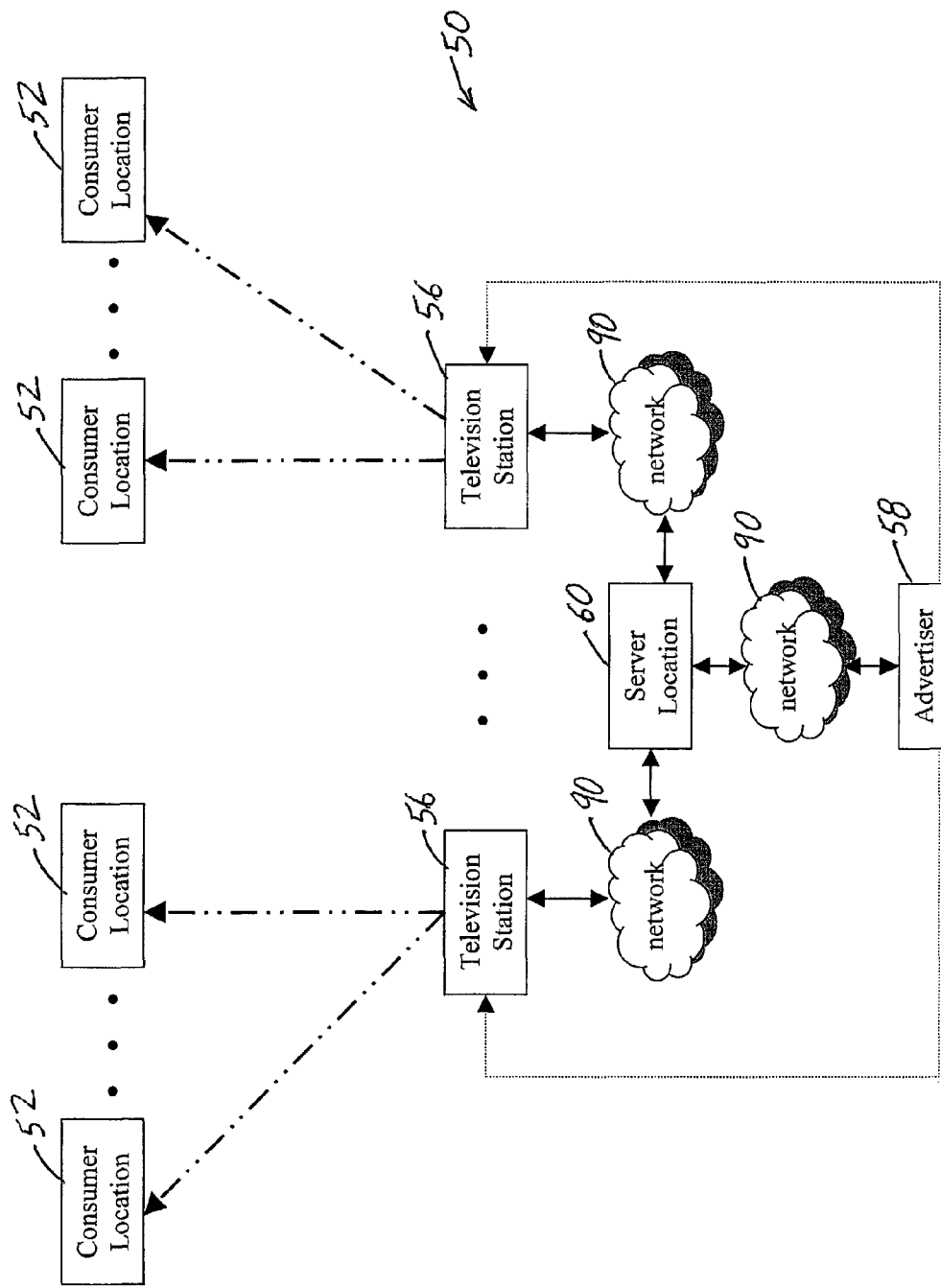
FIG. 3 is a schematic diagram of the system of FIG. 2 including a plurality of television signal processing locations each servicing a plurality of consumer locations.

Referring to FIG. 3, system 50 is shown including a plurality of television signal processing locations (e.g., television stations) 56, with each television signal processing location 56 being associated with a plurality of consumer locations 52. It will be appreciated that television signal processing locations 56 may provide the television signal to consumer locations 52 directly or through any number of additional television signal processing locations 56. For example, the television signal processing location 56 may include a regional television station source or a local broadcast source that transmits the television signals directly to consumer locations 52 via air or cable. In another example, the television signal processing location 56 shown may include a national network source, which processes television signals and provides them to one or more regional television station sources or to local broadcast sources for transmission to consumer locations 52. A single server location 60 may be associated with any number of television signal processing locations 56 and any number of advertiser locations 58.

The function of system 50 in performing a method for integrating television brand advertising with promotional marketing will now be discussed. When a manufacturer, retailer, television commercial distributor, company that traffics television commercials, or any combination thereof (hereinafter "advertiser") decides to promote a product or service using a cents-off coupon, the advertiser decides if the coupon is to be valid for consumers within an entire geographic area or whether the coupon is to be valid only for consumers within one or more market areas within the geographic area. Each geographic area may be defined by political areas (e.g., countries, states, counties, cities, etc.), product marketing regions, or other convenient criteria. Each market area is a portion of a geographical region, and may be defined by television Designated Market Areas (DMA), zip codes, political areas (e.g., countries, states, counties, cities, etc.), product marketing regions, or any other criteria. The advertiser might also decide that different price point offers (coupon values) are to be used for different market areas within the geographic area. The method and system for integrating television brand advertising with promotional marketing described herein allows for multiple price point offers over multiple geographic areas and market areas.

Figure 4:
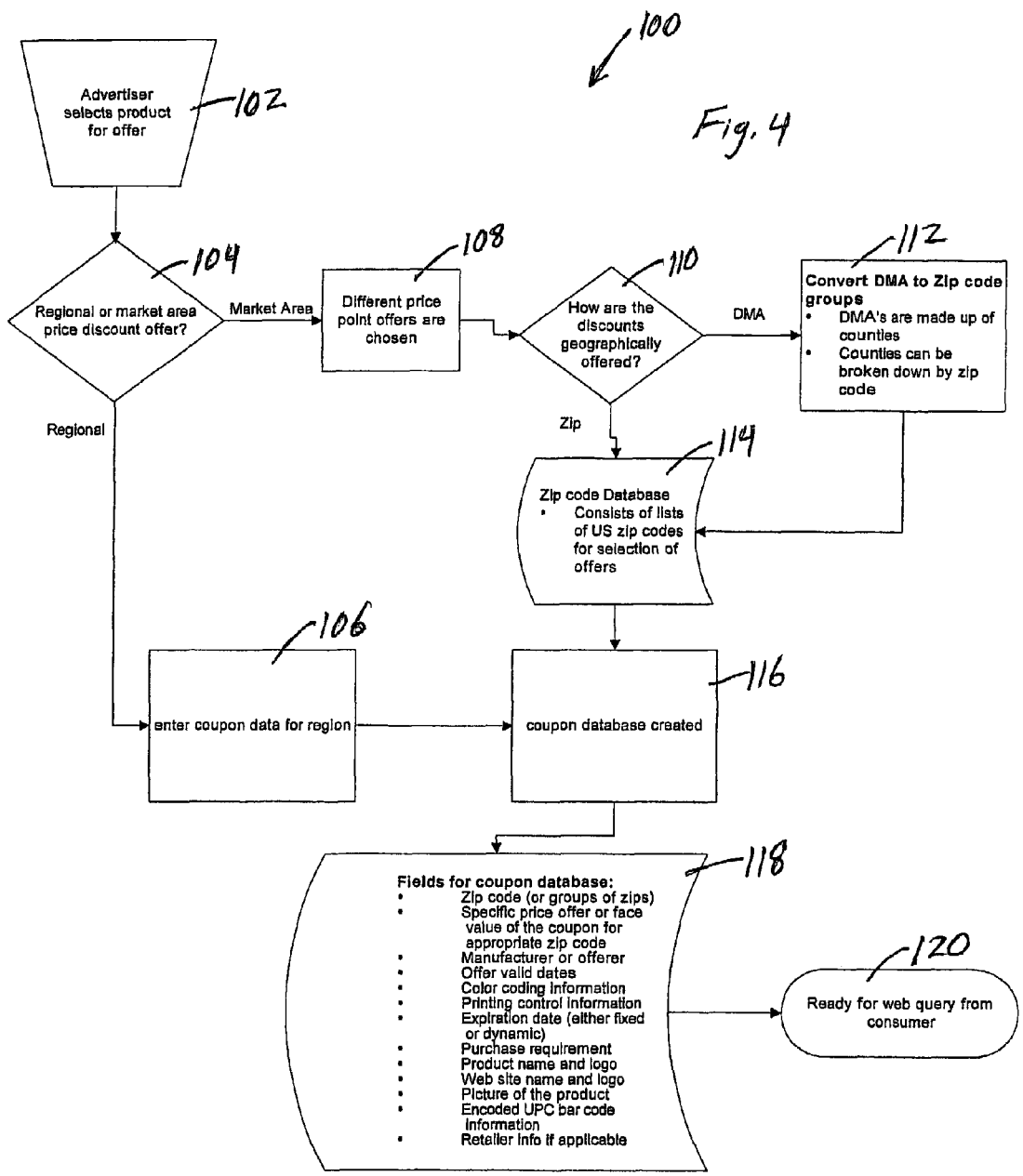
FIG. 4 is a flow chart depicting a process for creation of a coupon database.

After deciding on the geographic area, the market areas, and the price point offer for each geographic or market area, the advertiser then accesses a coupon database stored on server computer 82 via network 90 using computer 84. The server 82 is programmed with instructions for implementing a process 100 for creating a coupon database for the advertiser's product. A flow chart depicting an example of this process is shown in FIG. 4. In the example of FIG. 4, the geographic area is a nation, and the market area is a DMA or zip code area. Upon selecting a product and coupon offer for the product (block 102), the advertiser accesses the server 82. The advertiser is presented with a selection of whether the coupon offer is regional (e.g., national) or based on market area (e.g., DMA or zip code) (block 104). If the advertiser selects region, he or she is presented with a user interface allowing a single price point offer to be provided for the geographic area (block 106). For example, a soup advertiser may want to offer a $1 off coupon to everyone in the United States during the warm summer months, when soup sales are slower. If the advertiser selects market area, he or she is presented with a user interface allowing the different price point offers (cents-off offers) to be entered for different market areas (block 108). For example, a soup advertiser may offer a $1 off coupon on soup in a warmer climate market such as Las Vegas, where soup sales are lower. In the Boston DMA, the price point offer may only be $0.50, as more soup is consumed in colder climates, and the call to action can be a lower offer. In another example, an advertiser may offer a $1.00 off coupon to consumers in the same zip code, and offer no discount to consumers outside this zip code. The size of the market area, the number of market areas, and the number of different price point offers made to consumers within the different market areas can be configured as needed. The database stored on server computer 82 includes fields for identifying the advertiser, the market area(s) associated with the coupon offer, the price point offers for each geographic or market area, and other details. The system database is only limited to server computer 82 capacity, and this capacity can be expanded as needed by adding more memory to server computer 82, or more server computers 82 to the system.

After the different price point offers have been entered for the different market areas, the process continues where it is determined how the market areas are defined (e.g., by DMA or by zip code) (block 110), and the different market area definitions are converted to a single, predetermined market area definition (blocks 112, 114). In the example shown, if the different price point offers have been entered for different DMAs, the DMAs are converted to their corresponding zip code or codes. From either block 112 or block 114, the process 100 continues at block 116 where the coupon database is populated with the coupon offer data.

As shown at block 118, the coupon database may include fields such as: market area or areas in which the coupon offer is valid (e.g., zip code or codes for coupon offer), specific price point offer (value) of the coupon for the indicated market area or areas, advertiser (e.g., manufacturer) name, offer valid dates, color coding information, printing control or other security information, expiration date, purchase requirement, product name and logo, website name and logo, picture of the product, UPC bar code information, retailer information. After the database has been populated, the process ends (block 120).

Any number of advertisers may input coupon offers to the database on server computer 82 for any number of their products. As previously noted, the system database is only limited to server computer 82 capacity, and this capacity can be expanded as needed by adding more memory to server computer 82, or more server computers 82 to the system.

Referring again to FIG. 1, the advertiser records and edits the television commercial to its finished form, which is provided via video source 88 to encoder 86. The video source 88 may include a pre-recorded video tape, a video feed from a television station, a digitally stored video, or any other provider of video signals. The television commercial from video source 88 is then encoded with signals from computer 84 indicating the position, size, and duration of the indicator 10 that is to be placed in the television commercial. The indicator information will be downloaded to computer 84 from server 82 via network 90 for encoding into the television commercial.

Preferably the indicator information is encoded in the Vertical Blanking Interval, or VBI of the television commercial. This is the area of a video signal that is between video frames, and has capacity to contain small amounts of data. One example of VBI use is closed captioning for the hearing impaired, commonly contained on line 21 of the video signal. The Society of Motion Picture Television Engineers (SMPTE) has created a standard for data formats within the VBI (SMPTE Standard 334.m). The regional advertising information encoded into the commercial may be packetized, as described in U.S. Pat. No. 5,604,542.

The indicator information only needs to be encoded on the commercial once, as the appropriate indicator 10 to be inserted into the television commercial will be provided to the television signal processing locations 56, as is discussed in further detail hereinafter. Thus, only one specially encoded commercial needs to be created for any number of television signal processing locations 56. This will save time and money in distribution of the commercials, as different offers may be inserted nationally, locally, or regionally at the television signal processing locations 56.

After the indicator information is encoded into the television commercial, the encoded television commercial is sent to each television signal processing location 56 as a video tape, a digital video disk, a digital signal via a communications network, a video signal feed from a television station, or any other convenient means.

Figure 5:
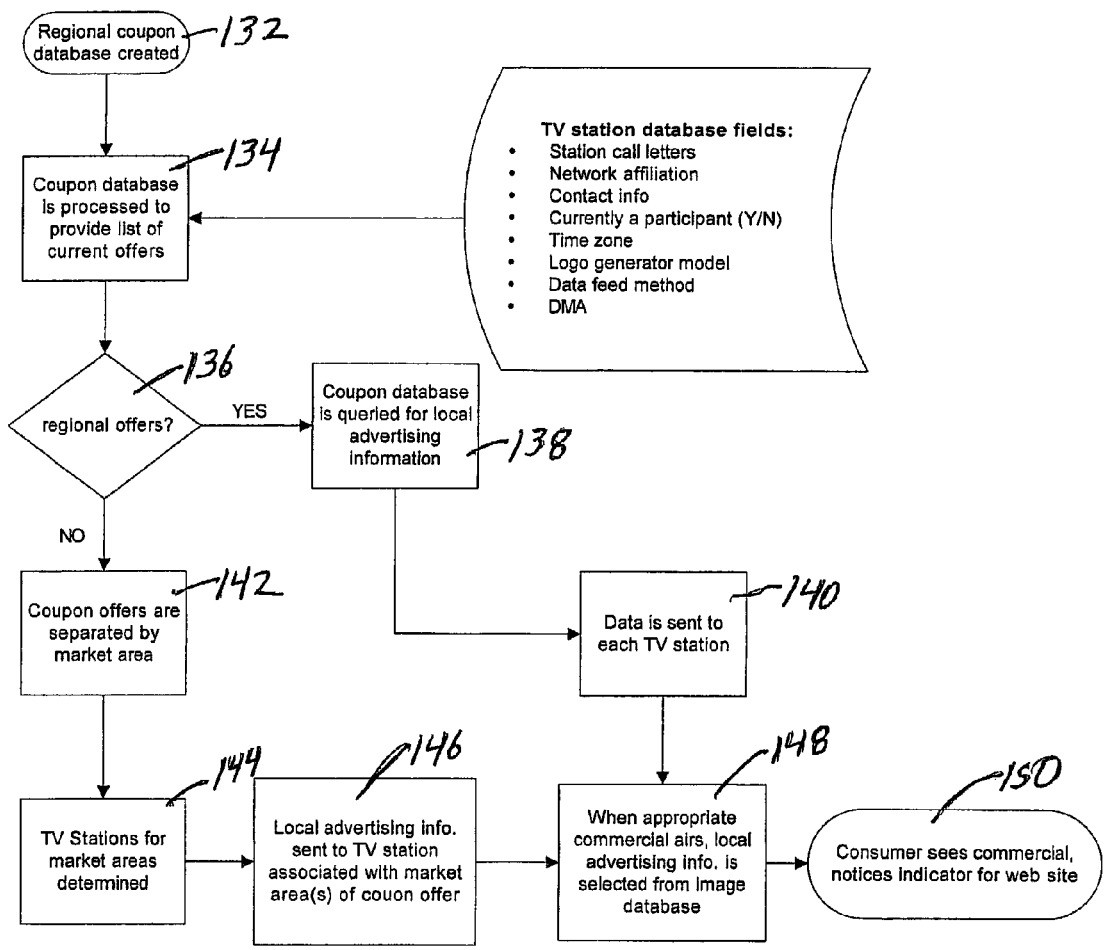
FIG. 5 is a flow chart depicting a process for providing local advertising information to television signal processing locations.

Referring to FIG. 5, a process 130 for providing advertising information to each television signal processing location 56 is shown. This process 130 may be performed at a predetermined frequency (e.g., once per day), or whenever the coupon database is updated. Information for each television signal processing location 56 is included in a TV station database in server computer 82. For each television signal processing location 56, the TV station database may include fields for information such as: station call letters, network affiliation, contact information, status of participation in system 50 (active, inactive), time zone, data regarding broadcasting equipment (e.g., decoder 76 and graphics generator 78) used at location 56, data feed method, and associated market area or areas (e.g., DMA, zip code, etc.).

After the coupon database has been created as described with reference to FIG. 4. (block 132), the coupon database is processed to provide a list of current coupon offers (block 134). For coupon offers available to the entire geographic area, advertising information is retrieved from the coupon database and is sent via network to each television signal processing location (blocks 136, 138, and 140). For coupon offers available to specified market areas, the coupon database is queried to determine the market area for each coupon offer (block 142), then the TV station database of is queried to determine the television signal processing locations 56 associated with the market areas of the coupon offers (block 144). The advertising information for each coupon offer is then sent to the television signal processing locations 56 associated with the market area or areas of the coupon offer (block 146).

After the advertising information is downloaded to the specific television signal processing locations 56 (blocks 140, 146), it is used to populate an image database in computer 84. The advertising information includes graphic images for the indicator 10, which is shown in FIG. 1. The advertising information may also include an audio tone to be inserted into the transmitted commercial, as an audio indicator of an offer to the consumer. When the commercial airs, the advertising information is selected from the image database in computer 84, inserted into the commercial (block 148), and transmitted to the consumer locations 52 (block 150) or provided to another television signal processing location 56.

As shown in FIG. 1, the indicator 10 may consist of a two-part graphic image having a first image 14 and a second image 16. The first image 14 identifies a website managed by server computer 82, alerting the consumer that there is a coupon offer for the specific product on the website. For example, the first image 14 may include at least a portion of a Uniform Resource Locator (URL) 18 of the website. The second image 16 contains a specific price point offer 20, be it cents or dollars off. This second image 16 can be customized for each market area individually by providing different local advertising information to different television signal processing locations 56. The number of images stored in the image database of computer 84 need not be that many. For example, there may be a first image 14, which always remains the same, and a few price point offer second images 16.

When the encoded commercial is provided by video source 74 at television signal processing location 56, the VBI encoded information is decoded by decoder 76 and provided to computer 72. The information about where, when, and what indicator 10 is to be displayed is included in the information, and will be used by computer 72 to query the appropriate location in the image database. For example, the decoded information may indicate that the indicator 10 is to be displayed in the lower left hand corner of the displayed commercial for a period of 20 seconds, and should appear 15 seconds after the start of the commercial. The image and audio information from the image database is retrieved by computer and output to graphics generator 78, which inserts the video signals for the indicator and any audio signals into the commercial.

After the indicator 10 has been inserted in the video signal for the commercial, television signals provided to another television signal processing location 56 or are provided to a transmitter 80 where they are transmitted to any number of consumer locations 52. The television signals may be transmitted to the consumer locations 52 using any conventional transmission system, such as, for example, a radio frequency transmission system, satellite transmission system, optical transmission system, or hard-wired (e.g., cable) transmission. Transmitter 80 transmits a television commercial to be received by the receiver 64 and displayed by the television monitor 12 at the consumer locations 52.

Periodically, the image database at one or more television signal processing locations 56 may be updated, either over network 90 or manually. This allows for the removal of indicators 10 associated with old offers, and the replacement of indicators 10 to reflect updated offers. If, for a particular television signal processing location 56, a computer 72 is not coupled to server 82 or does not have the necessary image database, the commercial simply plays without the indicator 10, with the encoded VBI data being ignored by the computer 72 and formatter 78.

While VBI encoding of the commercial is preferred, any commercially available encoder/decoder combination may be used. By allowing the encoded data to be in specific lines within the television signal, multiple decoder formats can be used within the same commercial, encoding it only once. Alternatively, with a national, regional, or local promotion campaign, all or part of the indicator 10 could be physically placed (not encoded) in the television commercial at, for example, the advertiser location 58, allowing television signal processing locations 56 that are not participating in the promotion to offer viewer benefit.

System 50 allows for the indicator 10 to be displayed on a local, regional, or national basis while allowing for coupon offers to be tailored to a geographical or market area basis. The indicator 10 may be discreet enough as not to distract from the brand advertising of the television commercial, but noticeable enough to viewers interested in promotional offers.

When a consumer viewing television monitor 12 is alerted to the specific offer by viewing the indicator 10, they can use computer 66 to connect to the website maintained by server 82 via network 90. The website is configured to determine the market area of the consumer using an input field to be filled in by the user or by querying a cookie located in the consumer's computer 66. The use of the unique identifier or "cookie" in computer 66 allows server 82 to identify a particular user and to target that specific user for specific coupon and price point offers, based on geographic location, past behavior on the website, or by coupons previously redeemed.

Figure 6:
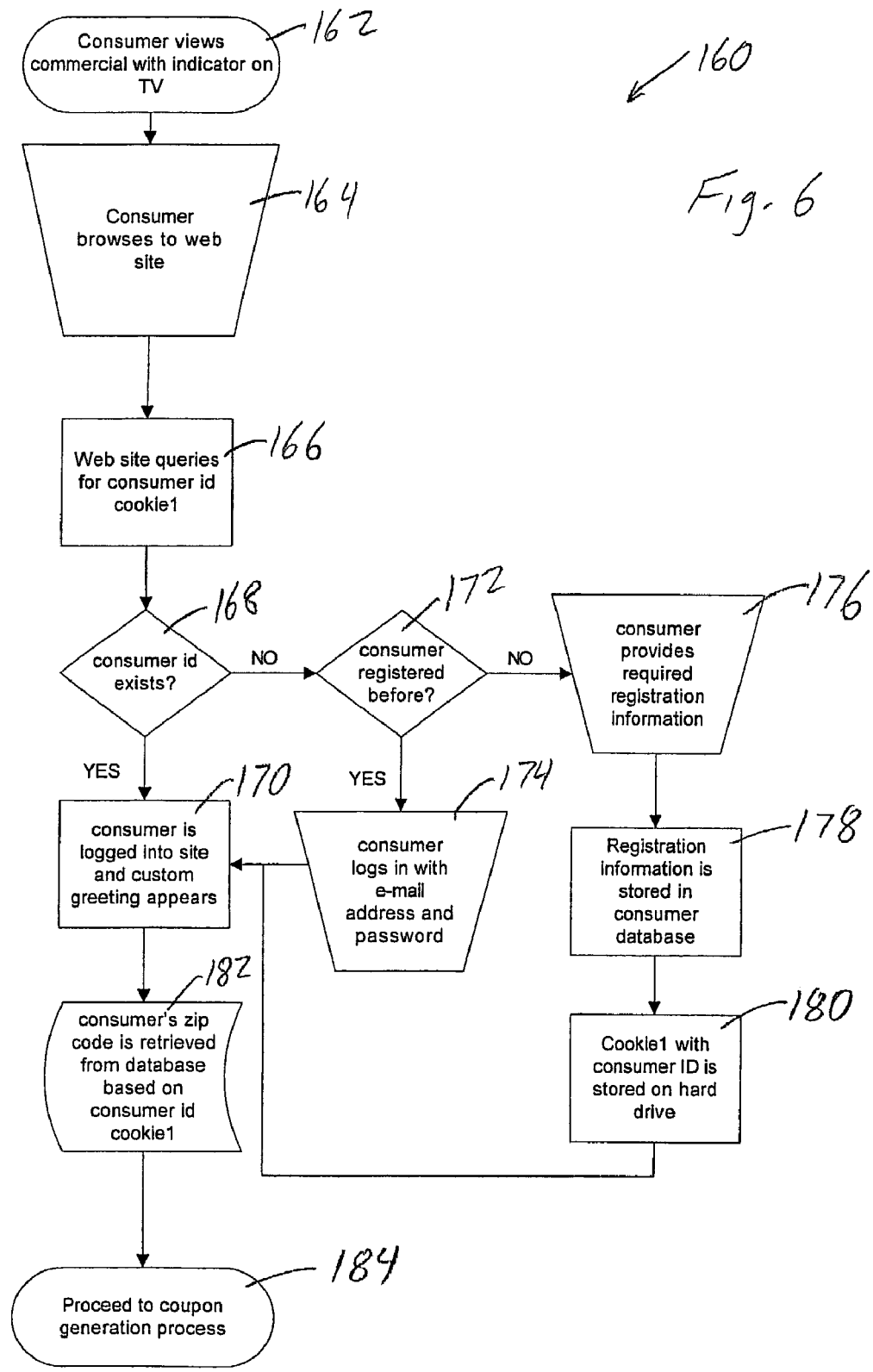
FIG. 6 is a flow chart depicting a process employed by a website for determining a market area of a consumer.

FIG. 6 is a flow chart depicting a process 160 that may be employed by server computer 82 for determining the market area of the consumer. After the consumer views the television commercial with the indicator 10 (block 162), the consumer browses the website indicated in the indicator using computer 66 (block 164). The website then queries the consumer's computer 66 for a cookie associated with the website (block 166). If the cookie exists (block 168), indicating that the consumer has previously logged into the site, the consumer is logged into the website and a customized greeting appears (block 170). If the cookie does not exist (block 168), the consumer is asked whether he or she has logged onto the site before (block 172). If the consumer responds affirmatively, the consumer is provided with a field for entering a password (block 174), and, after entering the password, the consumer is logged into the site and the consumer's information is retrieved from the consumer database (block 170). If the consumer responds negatively (block 172), the website queries the consumer for registration information such as an address, phone number, zip code, password, and the like (block 176). This information is then stored with a corresponding consumer identifier in the consumer database (block 178), and a cookie including the identifier is provided to computer (block 180). The consumer is then logged into the site (block 170). After the consumer is logged onto the site (block 170), the consumer's market area (e.g., zip code) is retrieved from the cookie in computer 66 (block 182), and the user is redirected to a coupon offer page in the website (block 184).

Figure 7:
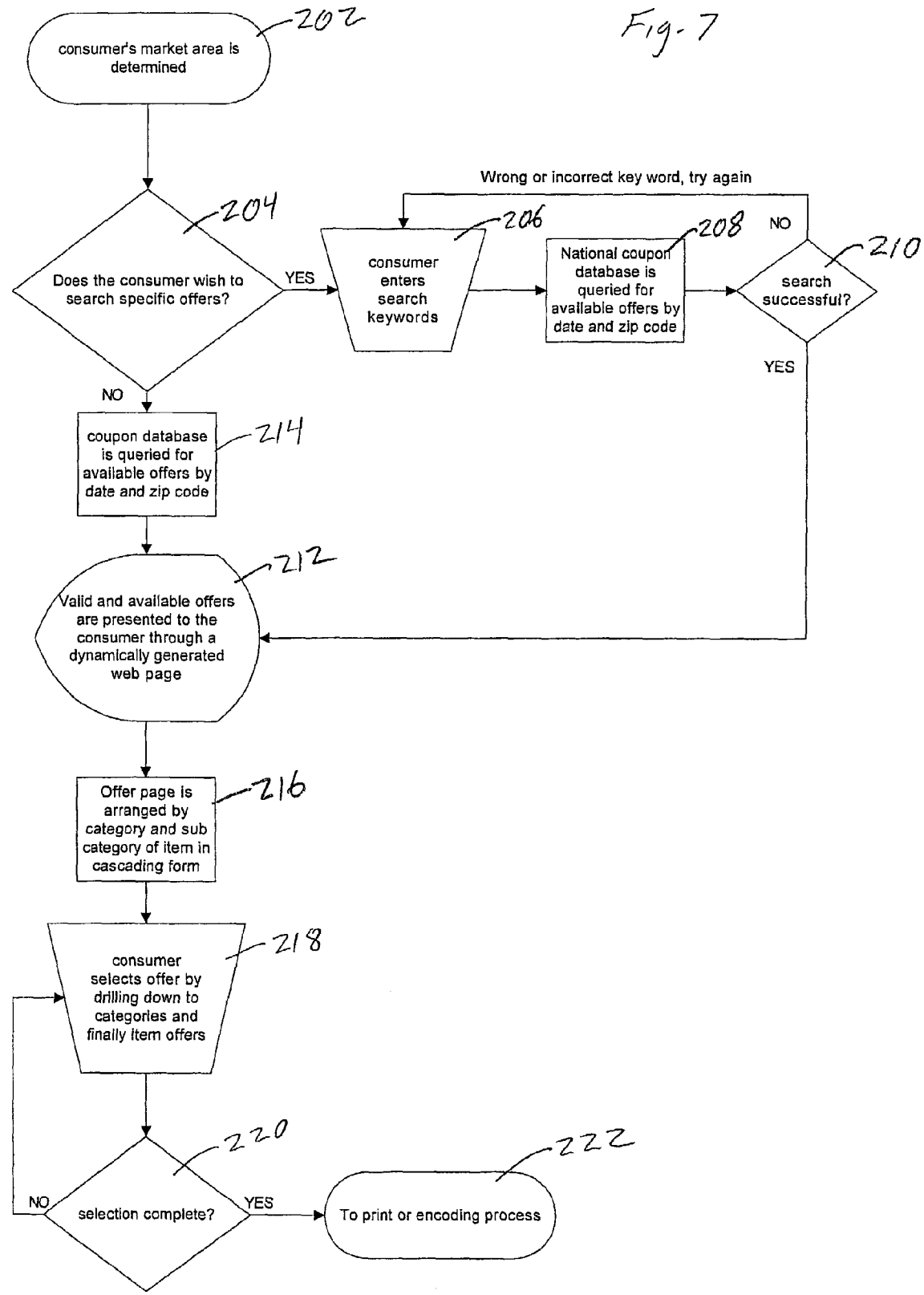
FIG. 7 is a flow chart depicting a process employed by the website for providing a selection of coupon offers to a consumer.

FIG. 7 is a flow chart depicting a process 200 employed by the website for providing the coupon offer page to the consumer. After the consumer's market area is determined using the process of FIG. 6 (block 202), the consumer is asked whether he or she wants to search for specific coupon offers (block 204). If the consumer answers affirmatively, the consumer is presented with a field to enter key words (block 206), which are used along with the consumer's market area to query the coupon database (block 208). If no coupon offers matching the key words and market area are found (block 210), the consumer is again asked to enter key words (block 206). If coupon offers are found (block 210), the consumer is presented with a listing of the matching coupon offers (block 212). If, at block 204, the consumer answers negatively, the coupon database is queried for coupon offers valid in the consumer's market area (block 214). If coupon offers are found, the consumer is presented with a listing of the matching coupon offers (block 212). The coupon offers may be presented to the consumer arranged by category and sub category of item (block 216). Associated with each coupon offer presented to the consumer is a check box, field, or the like, which allows the consumer to select one or more coupon offers from the list (block 218). After the consumer is finished selecting coupon offers (block 220), a coupon printing or encoding process 250, as shown in FIG. 8, is started (block 222).

Figure 8:
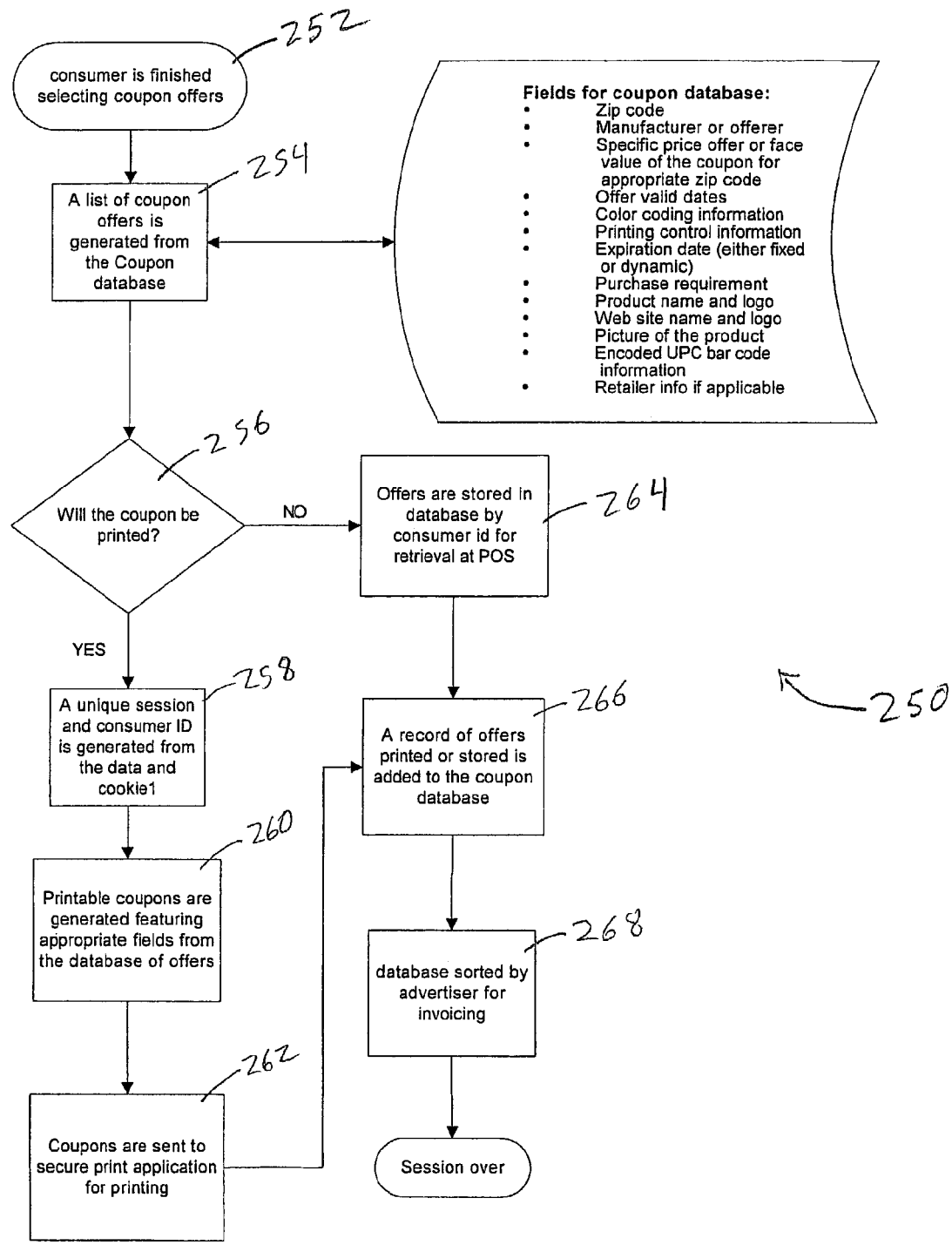
FIG. 8 is a flow chart depicting a process for coupon printing or encoding.

Referring to FIG. 8, the coupon printing or encoding process 250 begins after the consumer is finished selecting coupon offers (block 252). The process 250 continues at block 254, where a list of the coupon offers selected by the user is generated from the coupon database. At block 256, it is determined whether the coupon is to be printed. This decision may be made in response to a selection by the consumer, or by a predetermined setting made by the advertiser or operator of the website. If the coupon is to be printed, a unique session and user ID is generated from the coupon data and from the consumer's information (block 258). The coupons are then generated featuring the appropriate fields from the coupon database (block 260). The coupons are then sent to a secure print application for printing (block 262), and may be encoded with a unique identification. The consumer may choose to print the coupon in either color or black and white. The printed coupon contains specific pieces of data pulled from the database in server 82. These pieces of data may include: specific price point offer or face value of the coupon; color coding to prevent fraud; expiration date (either fixed or based on date printed); purchase requirement; product name and logo; "Internet Coupon" labeling; website name and logo; picture of the product; encoded UPC bar code; legal disclaimer wording. Each coupon may also be encoded with a specific user ID to prevent fraudulent redemption.

In one embodiment, the website managed by server 82 could provide the consumer with the ability to select a particular retailer or point of sale 54 for each coupon selected. The server 82 would then tailor the coupon for the particular retailer or point of sale 54. In another embodiment, a particular retailer or point of sale 54 may pay the advertiser or operator of the website to have the name of the retailer or point of sale 54, along with any additional savings for shopping at the retailer or point of sale 54, appear on the coupon. This may be limited by server 82 to consumers in certain market areas.

Depending on advertiser preference, the website managed by server 82 may allow for the printing of individual coupon offers on single sheets of letter-sized paper that would not require the coupons to be torn or cut to be redeemed. This single sheet of paper would help save in paper handling fees from a standard coupon redemption clearinghouse.

If the coupons are not to be printed (block 256), the coupon offers are stored in a database in server computer 82 by consumer identification (block 264). The coupon offers can then be retrieved by user identification at the point of sale 54. Alternatively, if the coupons are not to be printed (block 256), the coupon offers may be stored as credit associated with a customer loyalty card provided by a retailer. For example, a retailer may offer a customer loyalty card that, when used during check out at the retailer's store, provides a discount available only to customers with the loyalty card. Server computer 82 may be configured to provide the coupon offers to the point of sale location 54, or to a central server associated with point of sale location 54, where the coupon offers are stored as credit on the customer loyalty card. When the consumer uses the customer loyalty card at checkout at the point of sale location 54, the coupon discount will be applied. This may be an option available to the consumer on the website, or may be performed automatically by an agreement between the operator of the website and the retailer.

From either block 262 or block 264, process 250 continues at block 266, where a record of the offers printed or stored by the consumer is stored in an invoice database in server computer 82. Records in the invoice database are sorted by advertiser (block 268), which allows the operator of server 82 to bill the advertiser for the printing or selection of the specific offers. Software contained within the server 82 allows for specific control of the coupon offers, including number of coupons that can be printed by one individual.

Figure 9:
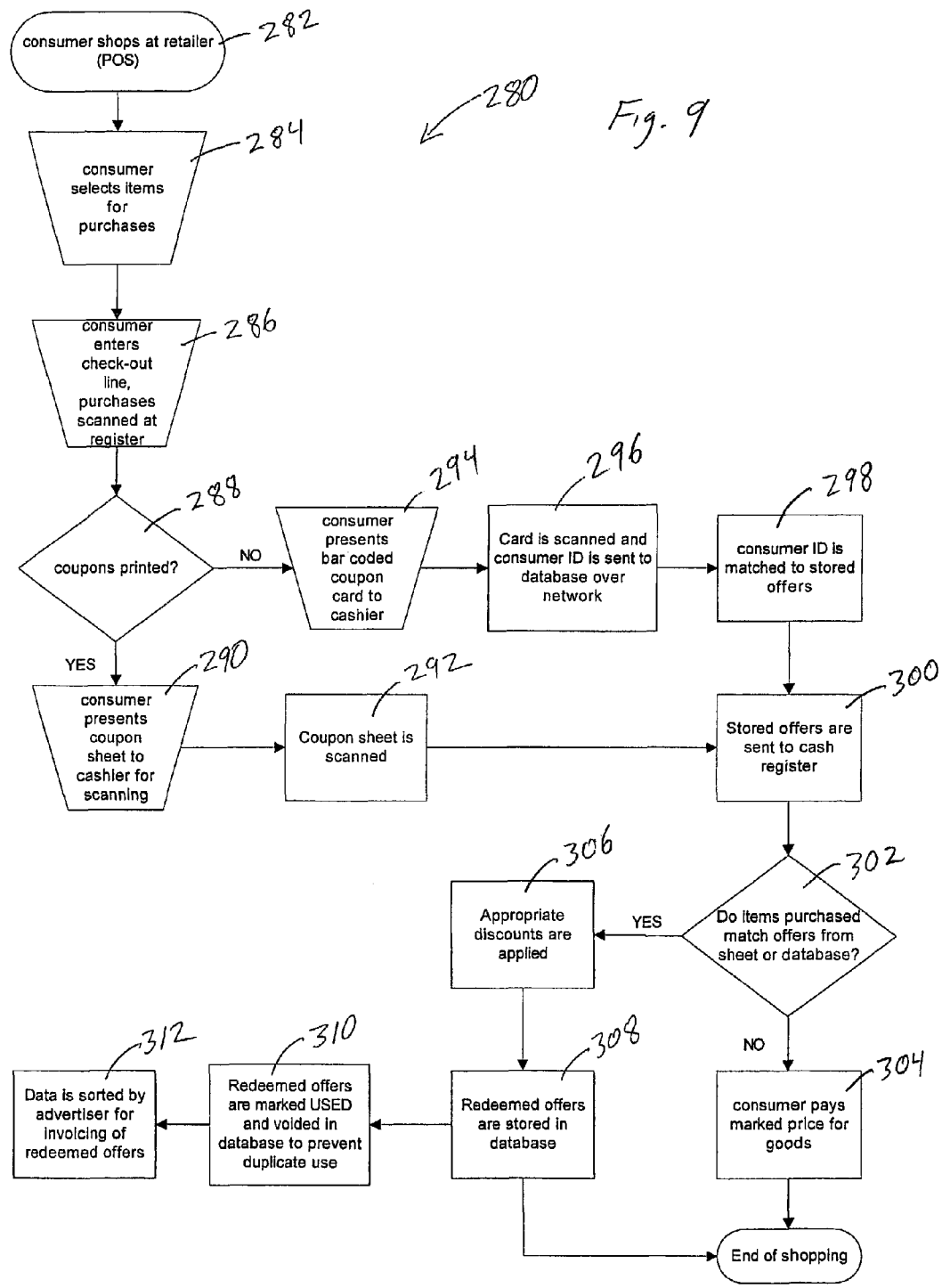
FIG. 9 is a flow chart depicting a retailer redemption process.

After the invoice database is sorted (block 268), the consumer's session at the website is over, and the consumer may redeem the coupons at the point of sale 54. Referring to FIG. 9, a coupon redemption process 280 is shown. When the consumer shops with the retailer at the point of sale 54 (block 282), they can select their products for purchase from their shopping list or coupon list (block 284). After the consumer has selected the products for purchase, they then enter the checkout line to purchase the products (block 286).

If the coupons are printed (block 288), the consumer presents the coupon to the retailer (block 290) and a scanning device at the point of sale 54, which may be part of register 70, is used to scan the entire sheet of coupons at once (block 292). The scanning device may include a feeder mechanism and bar code reader. Once the discounts have been applied to the purchase, the coupon sheet or coupons may be destroyed, marked as used, or otherwise voided. Scanning the bar code of the coupon provides the register 70 with information regarding the coupons, including each product and its associated discount (block 300).

If the consumer is using a coupon card, the consumer presents the retailer with the card (block 294), and the retailer scans or otherwise enters the consumer's coupon card and provides the coupon card ID to the server 82 via network 90 (block 296). If the coupon card is a customer loyalty card provided by the retailer, the coupon card ID is matched to coupon offers previously selected and stored as credit on the customer loyalty card (block 298). Information regarding each product and its associated discount (price point offer) are then provided to the register 70 (block 300) by any system employed by the point of sale location 54 for applying customer loyalty cards. Alternatively, if the coupon card is provided by the website operator, the consumer's coupon card ID is matched to coupon offers previously selected and stored by the consumer in server 82 (block 298). The server 82 then provides register 70 with information regarding each product and its associated discount (price point offer) via network 90 (block 300).

After the information for each product and its associated discount is provided to the register 70 (block 300), register 70 matches the products purchased to the specific coupon offers (block 302). If there is no match (block 302), no discount is applied to the products purchased by the consumer (block 304). If there is a match (block 302), the applicable discount is applied at the point of sale (306). If the register 70 is coupled to the server 82, point of sale redemption instantly occurs, and the sales data is provided by register 70 to server 82 via network 90. The sales data is then recorded in the server 82 database for invoicing the advertiser (blocks 308, 312). The sales data may also used to void the coupon offer in the server 82 for the particular customer to prevent duplicate use (block 310). If there is no point of sale redemption (e.g., if register 70 is not connected to network 90), the coupon is sent to a manual coupon redemption center for collecting and counting.

The data collected by server 82 for coupon printing/storage and for each coupon redemption may be provided in report form for use by advertisers or retailers. This report can be provided to advertisers and retailers on a yearly, monthly, weekly, daily, or sub-daily basis, and may be applied by advertisers or retailers in various ways. For example, a report indicating the number of coupon offers selected by consumers will allow an advertiser to determine the effectiveness of a coupon offer. In another example, the server 82 can detect if a specific coupon offer has been printed, but not yet redeemed. A report indicating this information will allow the advertiser to increase or otherwise change the offer to hasten redemption. In another example, the number of offers printed or stored by consumers in a market area can be used to forecast a demand for that product in that market area. With such forecasting ability, advertisers or retailers can stock a particular product in advance of this demand. Other information that may be reported by server 82 include number of site registrations, number of coupon cards versus number of printed coupons used, redemption rate as a function of discount, and the like.

The database in server 82 may be configured to allow advertisers to update their coupon offers themselves, using computer 82 at the advertiser location 58, allowing the advertiser to quickly change coupon offers without contacting the various television signal processing locations 56. Based on aggregate data received on specific redemption rates for specific offers, which may be stored in server 82 and retrieved by computer 84 or provided in the aforementioned reports provided by server 82, the coupon offer may be changed based on immediate and actual redemption data. This change to the coupon offer for the product can be made quickly by altering the coupon database in server 82 using computer 84 (or any other authorized computer) via network 90. Once the coupon database has been changed, the appropriate advertising information can be provided to the image database at each of the appropriate television signal processing locations 56. Thus, the next time the television signal processing location 56 transmits the television commercial, the updated indicator 10 will appear, and when the consumer accesses the website to retrieve the coupon, the coupon offer will have already been updated.

Figure 10:
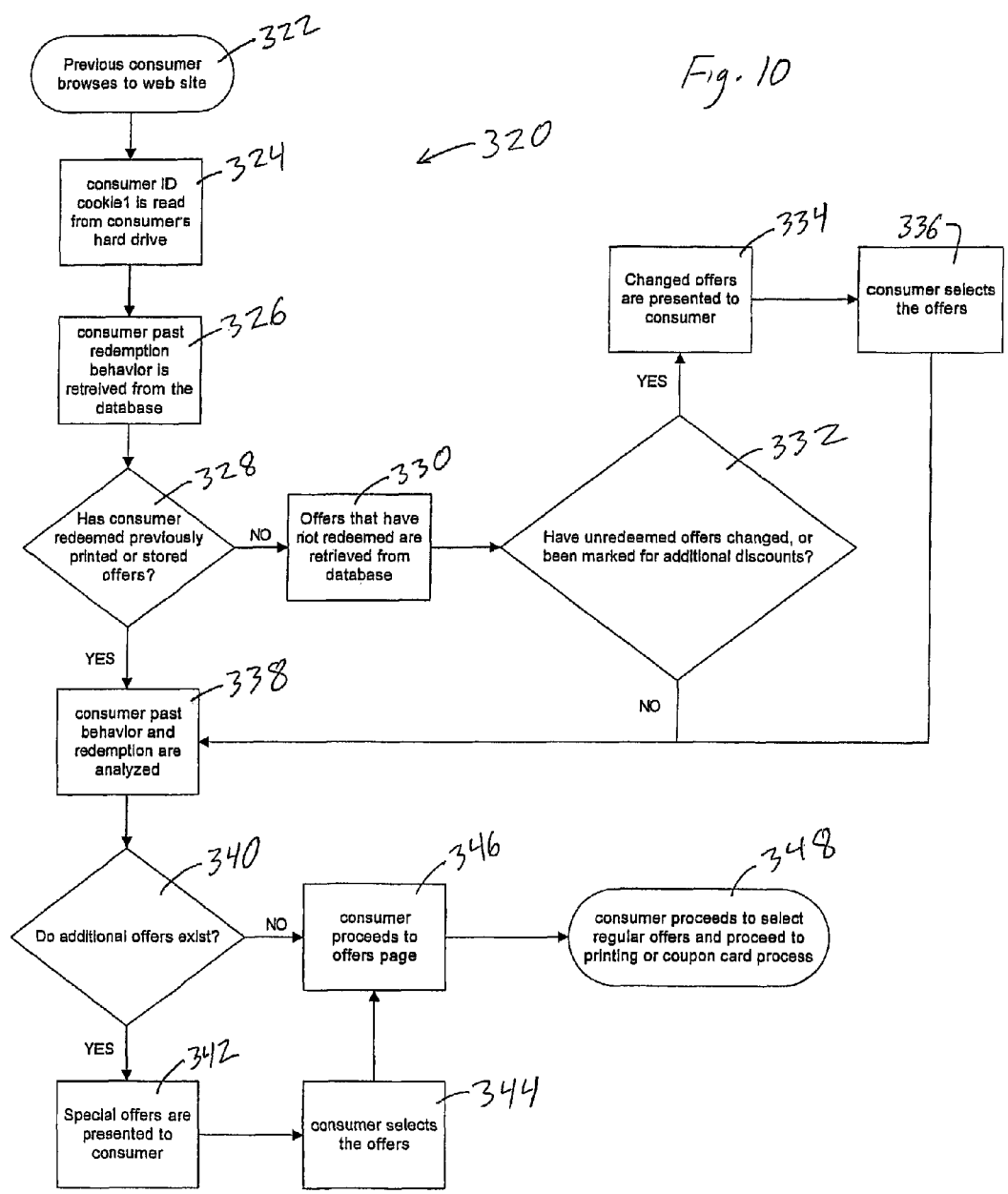
FIG. 10 is a flow chart depicting a process employed by the website for providing special offers to consumers who have visited the site previously.

FIG. 10 depicts a process 320 employed by the website managed by server 82 for providing special offers to consumers who have visited the website previously. When a previous consumer browses the website managed by server (block 322), the cookie is read from the consumer's computer 66

(block 324). Using the consumer's identification number from the cookie, the consumer's past coupon redemption behavior is retrieved from the database in server 82 (block 326). If the consumer has not redeemed coupon offers previously retrieved by the consumer from the coupon database (block 328), those unredeemed coupon offers are retrieved from the database (block 330). If any of these unredeemed offers have been changed or marked for additional discounts (block 332), these offers are presented to the consumer in interstitial or pop-up fashion (block 334), allowing the consumer to select the offers that appeal to them (block 336). After the consumer has selected the offers (block 336), or if the consumer has redeemed all previously printed or stored offers (block 328), the consumer's past behavior and redemption are analyzed (block 338). This analysis may include, for example, providing bonus points for the number of times a consumer has redeemed coupons. Based on the results of the analysis, the server then determines whether the consumer is entitled to other special offers (block 340). For example, additional cents-off may be provided to a consumer who has accumulated a certain amount of bonus points. The special offers may be presented to the consumer for selection in interstitial or pop-up fashion (block 342). After the consumer reviews and selects any desired offers (block 344), the consumer provided with the regular offers page of the website (block 346), as described with reference to FIG. 7, where the consumer can select regular offers and proceed to the coupon printing or coupon card process of FIG. 8 (block 348).

The present invention provides a way to use the large reach of television advertising to help target promotional or coupon marketing. This will allow greater efficiency of current advertising monies being spent on both brand and promotional advertising. It also allows greater time flexibility in the changing of offers, from months to mere hours and the ability to offer quickly-perishable coupons. For example, if the manufacturer noticed a particular coupon offer was not doing well in one market area vs. the rest of the region, all they would have to do is contact the server location 60 with instructions to change the coupon offer. This may be accomplished through a connection with server 82 via network 90. Within hours or minutes, the coupon offer in the database in server 82 would be changed, and advertising information including the change would be downloaded to computer at the television signal processing location 56 associated with the market area, where the image database in computer would be updated to include the changed price point offer displayed in indicator 10. The next time the TV commercial is transmitted for that product, the new price point offer would be presented to the consumer. To change the same offer in a nationally printed FSI would take months, if not being impossible.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

I claim:

1. A method implemented using one or more computers, comprising:
   receiving, at a server, coupon information communicated directly from a plurality of advertisers to the server, the coupon information defining a plurality of coupon offers for different products, wherein the coupon information from at least some of the advertisers specifies one or more parameters for distributing one or more coupon offers;
   communicating, across one or more networks, from the server, to multiple television stations, a visual website indicator, wherein the visual website indicator indicates a website associated with the server at which the plurality of coupon offers are made available;
   the server maintaining information about the multiple television stations, from which television commercials are broadcast to a plurality of users; and
   based on the coupon information specified by the plurality of advertisers and the information about the multiple television stations, the server communicating to the multiple television stations: (a) first data indicating a plurality of television commercials into which the same visual website indicator is to be inserted, (b) a plurality of price point indicators indicating price points for the one or more coupon offers, and (c) second data indicating, for each television commercial in the plurality of television commercials, which particular price point indicator of the plurality of price point indicators to insert into which particular television commercial in the plurality of television commercials;
   wherein the first data and the second data collectively indicate that a particular television station is to 1) insert the visual website indicator with a first price point indicator into a first television commercial prior to the particular television station broadcasting the first television commercial, and 2) insert the visual website indicator with a second price point indicator that is different from the first price point indicator into a second television commercial prior to the particular television station broadcasting the second television commercial;
   wherein the server is at a location other than locations of the multiple television stations and the advertisers;
   wherein the server is logically separated from the multiple television stations and the advertisers by one or more communications networks comprising any of a local area network, wide area network, and an Internet.

2. The method of claim 1, wherein receiving the coupon information includes the server receiving from the advertisers information that indicates the price points associated with the one or more coupon offers.

3. The method of claim 1,
   wherein the first price point indicator is a first price point offer image that represents a first price point offer for a first coupon offer pertaining to a first product advertised in the first television commercial.

4. The method of claim 3, further comprising:
   receiving updated coupon information that includes an update to the first price point offer; and
   the server communicating to the particular television stations information for updating the first price point offer image that is displayed in the first television commercial.

5. The method of claim 1, wherein receiving the coupon information includes receiving, for each coupon offer of the plurality of coupon offers, a first parameter corresponding to one or more geographic market areas that are desired by the advertiser;
  wherein the method further comprises using the first parameter for each coupon offer of the plurality of coupon offers to identify the multiple television stations and to determine, for each of the multiple television stations, into which of the plurality of television commercials the visual website indicator is to be inserted.

6. The method of claim 1, further comprising:
responding to a given viewer of any one of plurality of television commercials that contain the visual website indicator that has accessed the website by selecting, from the plurality of coupon offers, one or more coupon offers available to the given viewer, wherein the selecting is performed using at least one or more (i) of a location of the given viewer, or (ii) one or more coupon offers that were previously redeemed by the given viewer.

7. The method of claim 1, wherein providing the website includes providing a printable coupon at the website for redeeming at least one of the corresponding coupon offers.

8. The method of claim 7, wherein providing at the website a printable coupon includes providing an offer identifier on the printed coupon.

9. The method of claim 7, wherein providing at the website a printable coupon includes providing identification information on the printed coupon.

10. The method of claim 7, wherein providing at the website a printable coupon includes publishing one or more anti-fraud markings on the printed coupon.

11. The method of claim 1, wherein providing the website includes enabling users of the website to credit a card device in order to redeem at least one of the coupon offers.

12. The method of claim 11, wherein the card device is a customer loyalty card provided by a retailer.

13. The method of claim 1, further comprising: identifying, from activity at the website, a number of instances that individual coupons provided by a corresponding advertiser have been printed by users of the website.

14. The method of claim 1,
  wherein receiving the coupon information includes the server receiving, for a particular coupon offer specified by the given advertiser of a given product, a first price point offer for a first geographic market area, and a second price point offer for a second geographic market area; and
  wherein the step of communicating the first data, the price point indicators, and the second data includes: the server selecting one or more television stations for broadcasting television commercials in each of the first geographic market area and the second geographic market area; the server providing information, to the selected one or more television stations of the first geographic market area, for including an image of the first price point offer with the visual website indicator in a television commercials for the given product when the television commercial is broadcast from the selected one or more television stations of the first geographic market area; and the server providing information, to the selected one or more television stations of the second geographic market area, for including a second image of the second price point offer with the visual website indicator in the same television commercial for the given product when the television commercials is broadcast from the selected one or more television stations of the second geographic market area.

15. The method of claim 1, wherein the visual website indicator is an image that displays at least a portion of a Uniform Resource Locator for locating the website.

16. The method of claim 1, further comprising:
determining, from a given user's interaction with the website, which of the plurality of coupon offers to display to the given viewer; and
identifying a television commercial that contained the visual website indicator that the given viewer viewed prior to accessing the website.

17. The method of claim 1, further comprising:
interacting with a computer of a given user who accesses the website;
determining, at the website, which of the plurality of coupon offers to make available to the user based on information determined from interacting with the computer of the given user.

18. The method of claim 17, wherein interacting with the computer includes identifying a cookie stored on the given user's computer.

19. The method of claim 1, further comprising:
determining, from information provided by a given user interacting with the website, one or more coupon offers the given viewer is interested in;
using the determined information to identify a geographic market area of the given user; and
selecting one or more coupon offers based on the identified geographic market area.

20. The method of claim 19, further comprising identifying which television commercial the user viewed that includes the indicator to the website from the information provided by the given user.

21. The method of claim 1, wherein receiving coupon information includes receiving, from a given advertiser, a designated geographic market area from which a corresponding coupon offer is to either be made available or provided at a given value, and then selecting the multiple television stations.

22. The method of claim 21, wherein receiving coupon information includes receiving an update of the one or more parameters for individual coupon offers, and wherein the method further comprises re-selecting the multiple television stations based on and responsive to receiving the update of the one or more parameters.

23. The method of claim 1, wherein the first data is included in the second data, wherein at least a first station of the multiple television stations receives a different set of the first data or the second data than a second station of the multiple television stations.

24. A method implemented by one or more computers and comprising the steps of:
  (a) receiving, at a server associated with a website, and directly from each of a plurality of advertisers, coupon information that specifies a corresponding coupon offer on the website, the coupon offers of the plurality of advertisers being for different products, wherein the coupon information specified for each coupon offer includes one or more parameters;
  (b) for each coupon offer, the server selecting, based on the one or more parameters, multiple sources from which television commercials are broadcast;
  (c) for at least a particular coupon offer of the coupon offers, the server communicating, across one or more networks, to resources operated at each of the multiple sources that are selected for the particular coupon offer, advertisement information configured to facilitate selection of a particular television commercial, associated with the particular coupon offer, in which a visual indicator of the website is to be inserted prior to broadcast of the particular television commercial;

(d) the server communicating to a first source a first visual indicator to be inserted into the particular television commercial, the first visual indicator depicting a first price point;

(e) the server communicating to a second source a second visual indicator to be inserted into the same particular television commercial, the second visual indicator depicting a second price point different than the first price point;

wherein the server is at a location other than locations of the sources and the advertisers;

wherein the server is logically separated from the sources and the advertisers by one or more communications networks comprising any of a local area network, wide area network, and an Internet;

wherein communicating to the one or more sources is performed in response to an advertiser of the coupon offer providing the individual coupon offer on the website.

25. The method of claim 24, further, comprising selecting the first visual indicator for the first source and the second visual indicator for the second sources based on one or more parameters corresponding to one or more geographic market areas associated with the particular coupon offer.

26. The method of claim 24, wherein step (a) includes enabling each advertiser to specify, on the website, one or more parameters corresponding to one or more geographic market areas and one or more price points for the corresponding coupon offer of that advertiser.

27. The method of claim 24, wherein step (a) includes enabling each advertiser to associate one or more specific geographic market areas with the corresponding coupon offer of that advertiser; and step (b) includes selecting, for one or more corresponding coupon offers, the one or more sources from which television commercials are broadcast based on the specific geographic market area associated with each of the one or more corresponding coupon offers.

28. The method of claim 27, wherein subsequent to performance of step (a) through step (c), the method further comprises steps of:

enabling the advertiser to alter the geographic market area associated with the coupon offer at the website; and re-selecting the one or more sources based on the altered geographic market area associated with the corresponding coupon offer.

29. The method of claim 24, wherein step (a) includes enabling each advertiser to associate one or more price points with the corresponding coupon offer of that advertiser; and wherein the first visual indicator and the second visual indicator specify different price points for the same product.

30. The method of claim 24, wherein step (a) includes enabling each advertiser to associate one or more price points and one or more geographic market areas with the corresponding coupon offer of that advertiser, including enabling each advertiser to designate a particular price point with a specific geographic region; and for each advertiser that associates the one or more price points and the one or more geographic regions market areas the corresponding coupon offer of that advertiser, step (b) includes:

selecting the one or more sources from which television commercials are broadcast based on one or more geographic market areas associated with a coupon offer of that advertiser, and wherein the visual indicator communicated to each particular source of the multiple sources includes a common website indicator and an indicator for the price point that is designated with the geographic market area from which that particular source is selected.

* * * * *